Feb. 8, 1966 R. L. FORD 3,233,521
RAIL LEVELING DEVICE
Filed Nov. 27, 1963 4 Sheets-Sheet 3
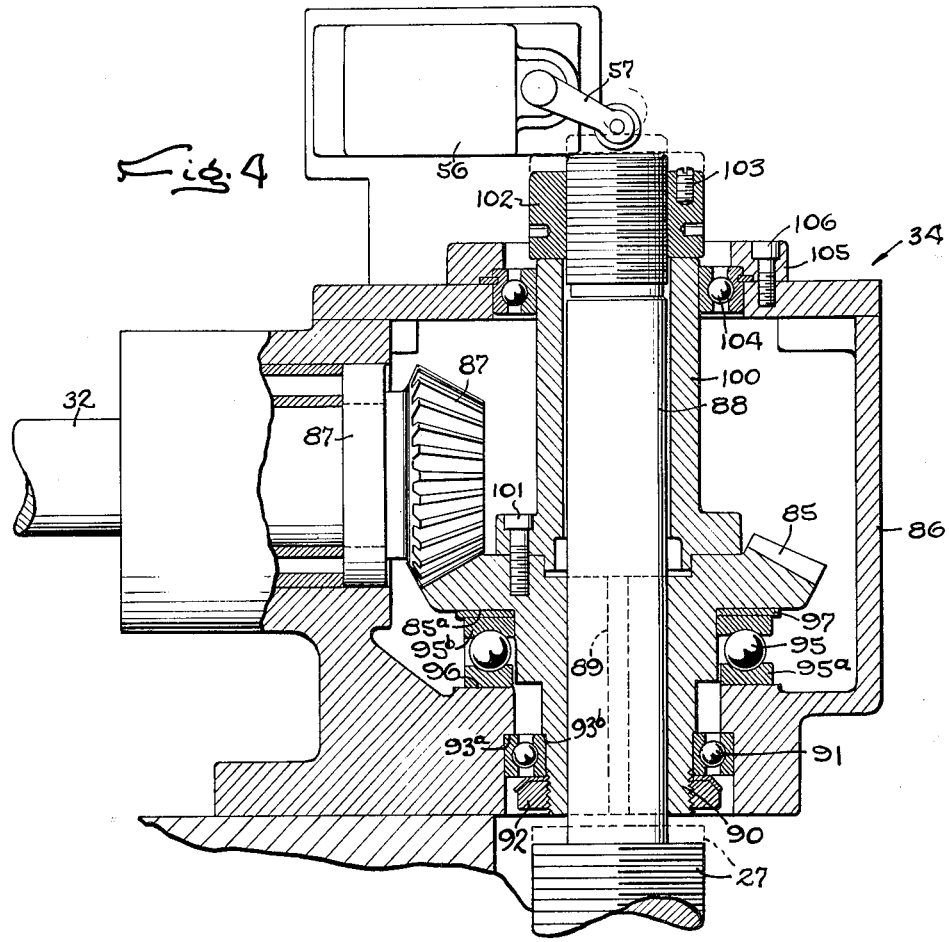
Fig. 4
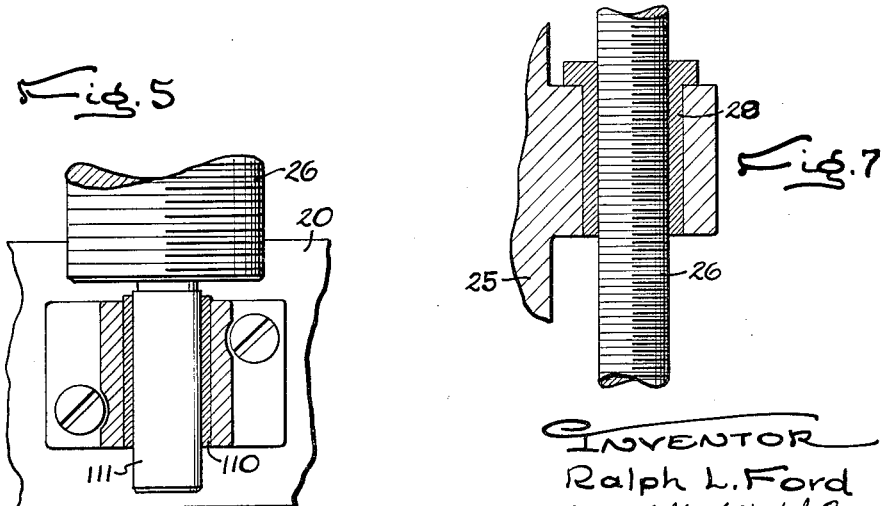
Fig. 5
Fig. 7
INVENTOR
Ralph L. Ford
Wolfe, Hubbard, Voit & Osann
ATTORNEY

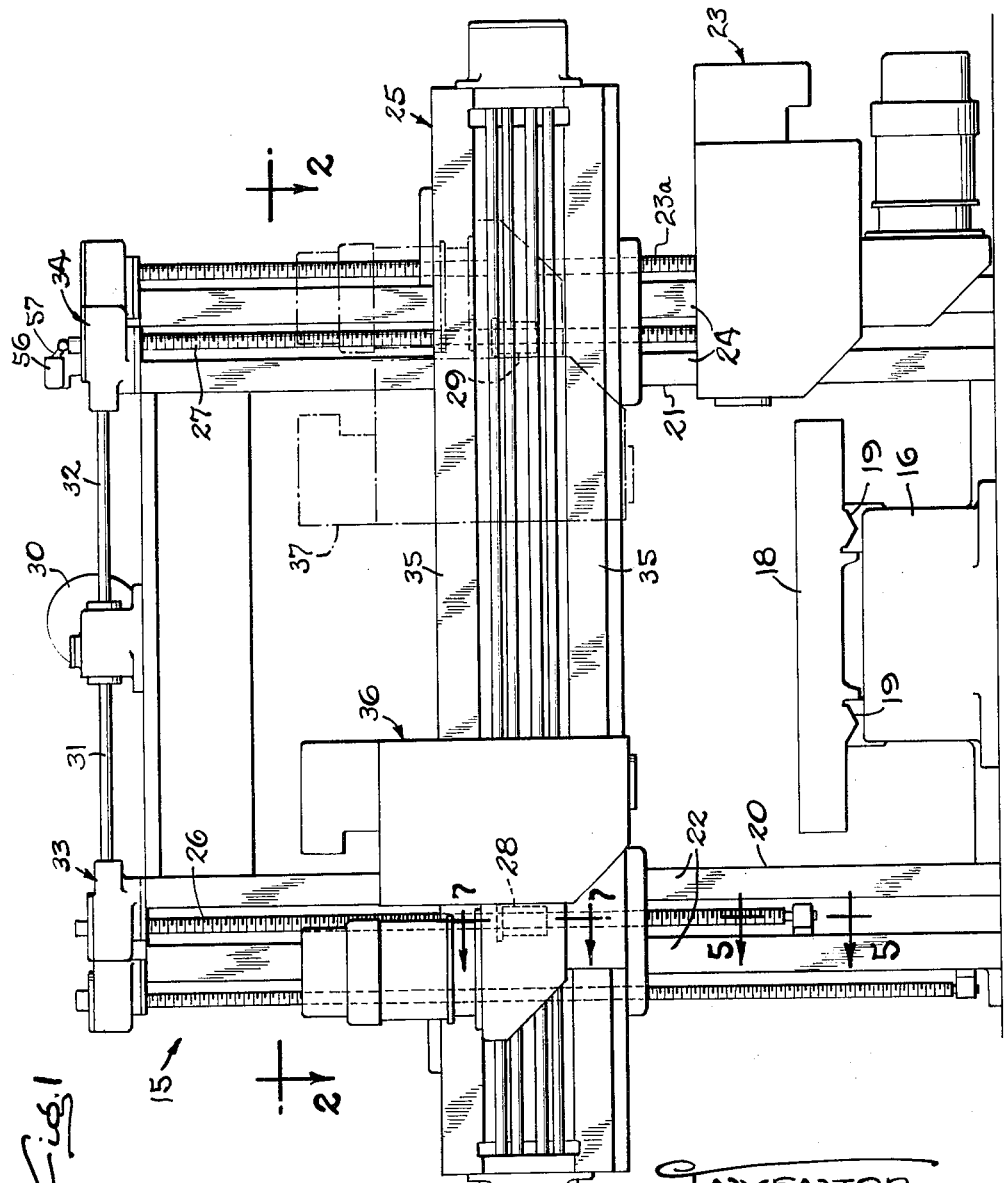

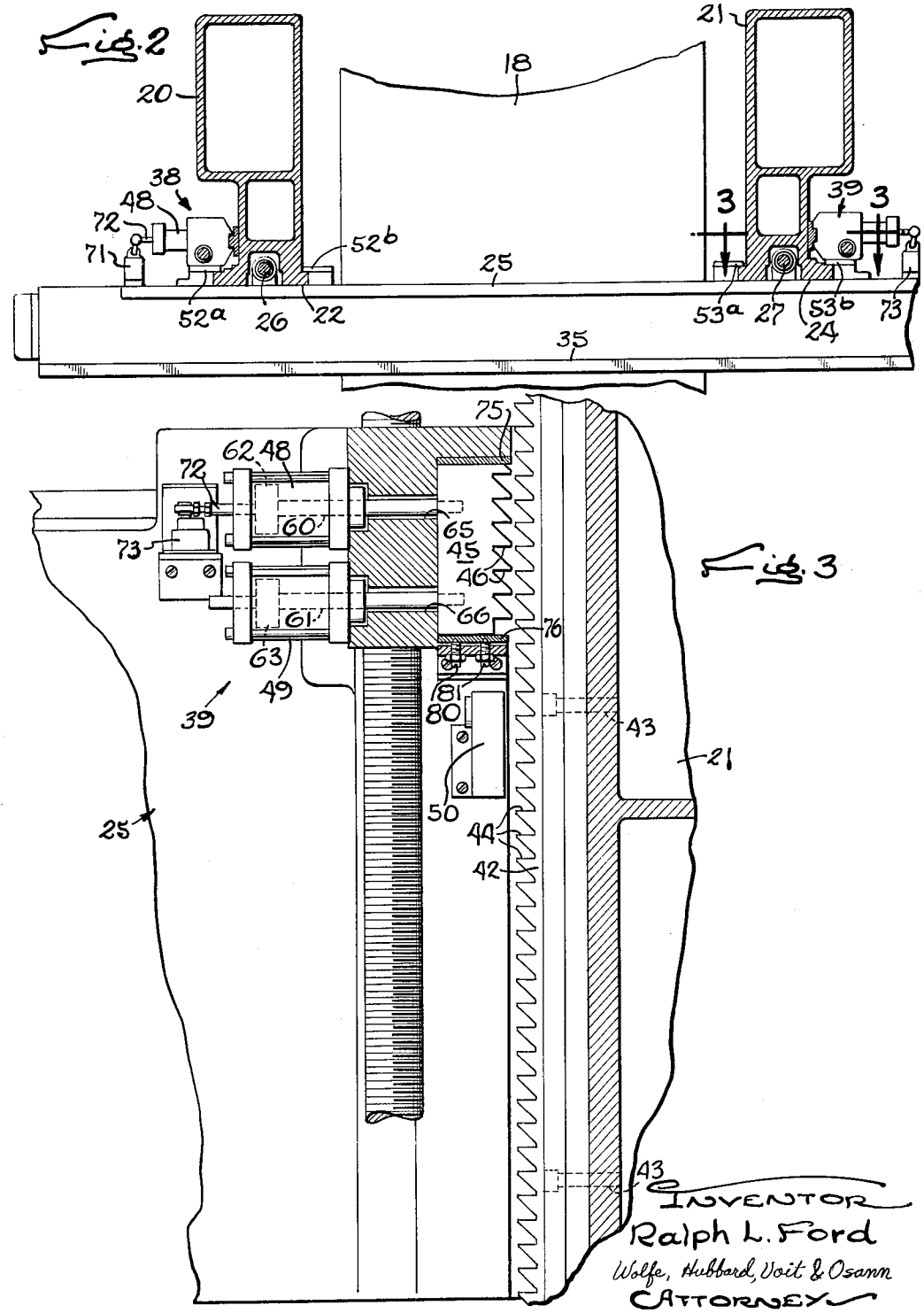

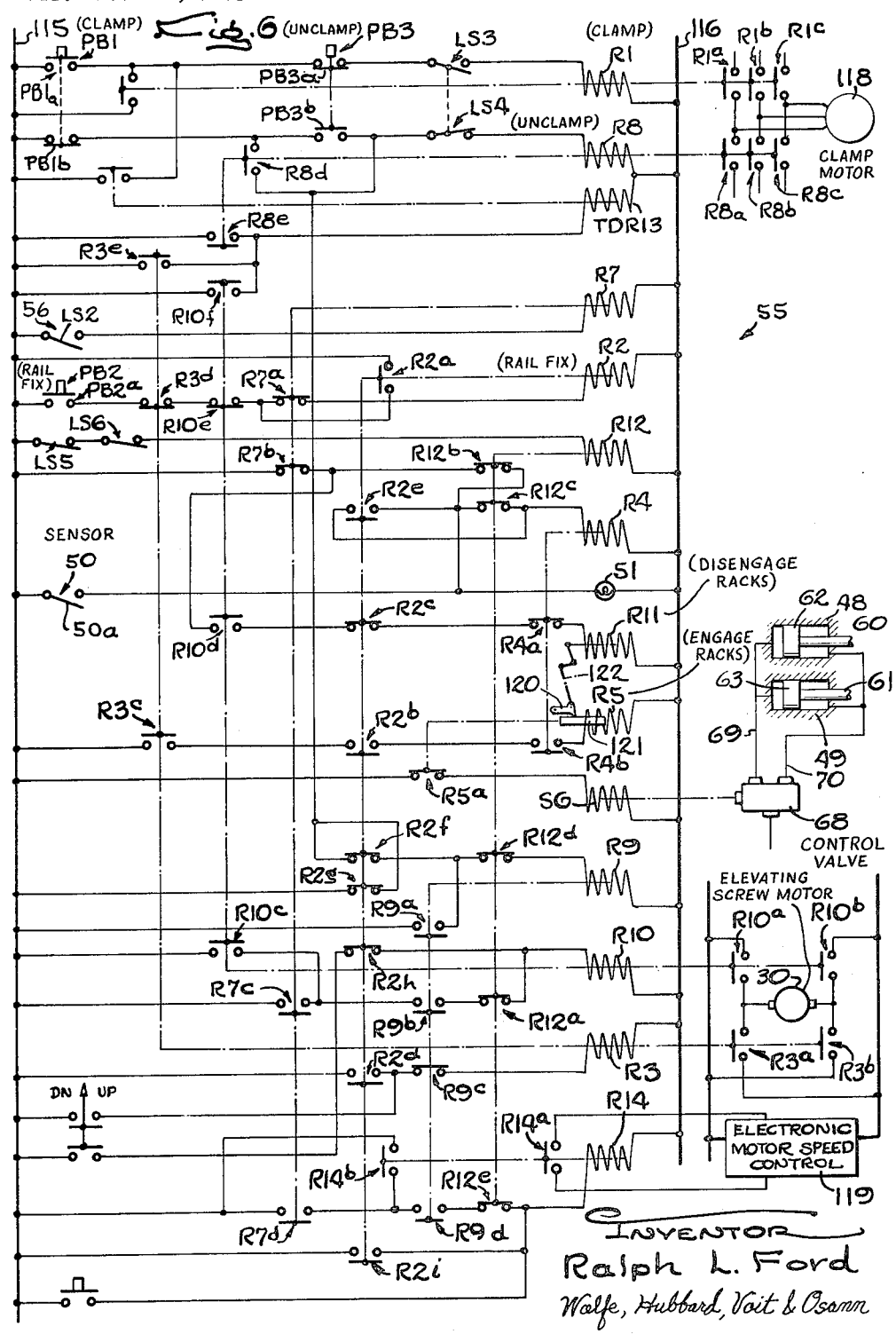

United States Patent Office 3,233,521
Patented Feb. 8, 1966

3,233,521
RAIL LEVELING DEVICE
Ralph L. Ford, Fond du Lac, Wis., assignor to Giddings & Lewis Machine Tool Company, Fond du Lac, Wis., a corporation of Wisconsin
Filed Nov. 27, 1963, Ser. No. 326,495
9 Claims. (Cl. 90—16)

The present invention relates to machine tools having a vertically movable machine member such as a crossrail and more specifically to a leveling mechanism for supporting such a machine member.

It is customary in the machine tool art to provide a crossrail for supporting a tool holder or headstock which travels longitudinally along the crossrail over a work table. These tool holders or headstocks are heavy, some weighing as much as 6,000 or 7,000 pounds. The combined weight of the headstocks and crossrail is supported on a carrying means. In one commercial unit, the latter takes the form of a pair of elevating screws, one screw disposed at each of the opposite ends of the crossrail. The elevating screws raise and lower the crossrail relative to the table.

During operation the headstocks traverse along the crossrail. If their weight is concentrated to either side of the center of the rail, both elevating screws do not equally support the combined weight of the rail. The result is that one elevating screw deforms more than the other and the tool holders carried on the rails are tipped moving from the desired precise position and are not held accurately. Several attempts have been made to solve the problem. In the past extra large elevating screws have been used to reduce stretching to a reasonable amount. However, these have not provide entirely satisfactory. Also, friction clamps have been provided on the crossrail to clamp the crossrail to the upright columns. However, the clamps cannot hold the crossrail level under the extreme stress resulting from the combination of weight and vibration due to cutter action of the work tool. One solution to the problem has been provided in a counterbalance system for supporting the headstocks (see Daugherty U.S. Patent No. 2,696,763 and U.S. Patent No. 2,899,869). These systems, however, tend to be costly.

Accordingly, it is an object of the present invention to provide a selectably operable system for assuring level support of a movable machine tool member such as a crossrail meanwhile permitting full range positioning of the movable machine member. While not so limited in its application, the invention will find especially advantageous use in a planer type milling machine having a pair of upright columns spanned by a crossrail carried at its opposite ends by a pair of elevating screws. In the practice of the present invention the crossrail is selectively fixed to the upright columns to effect rigid support at predetermined relative positions of the rail. To this end in accordance with the teachings of the present invention, a coupling structure is provided between the crossrail and the upright columns operated by a control circuit which automatically effects transfer of support between the elevating screw and the upright columns.

A related object of the present invention in accordance with the above is to provide a system which automatically effects fixing or unfixing of the crossrail or other heavy movable machine member once operation of the system is initiated and which has built-in protection against jamming of the coupling mechanism. Along these lines it is an object of the present invention to coordinate fixing of the machine member with other support systems now in use on machine tools to effect improved support of the work tool carrying structure.

An ancillary object of the invention in accordance with the above is to provide a leveling mechanism for a work tool carrying structure which is reliable in operation, economical to manufacture and easy to adapt to conventional machine tools.

Other objects and advantages of the invention not at this time enumerated, will become readily apparent as the nature of the invention is better understood.

In the accompanying four sheets of drawings forming a part of this specification:

FIGURE 1 is a front elevational view of a planer type milling machine embodying the present invention;

FIG. 2 is a section taken along 2—2 in FIG. 1 showing the mechanism for coupling the crossrail to the housings;

FIG. 3 is a section taken along 3—3 in FIG. 2 showing the details of the coupling assembly on one side of the machine shown in FIG. 1;

FIG. 4 is an enlarged section of a portion of FIG. 1 showing the gear assembly at the top of one elevating screw for transmitting drive to the elevating screw;

FIG. 5 is an enlarged section taken along 5—5 in FIG. 1 showing the elevating screw supporting bearing at the elevating screw lower end;

FIG. 6 is a schematic of the control circuit for coordinating operation of the rail leveling mechanism; and FIG. 7 is a section taken along 7—7 in FIG. 1 showing the coupling between the elevating screw and the crossrail.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

For the purpose of exemplification, the invention has been shown and described herein as embodied in the planer type milling machine. The particular machine chosen for illustration is of relatively large size and the movable elements thereof, particularly the headstock and supporting saddle, are adapted to be displaced through relatively large distances while the machine is in operation. Despite this fact, the invention assures that the elevating screws are not stretched and the position of the headstock on the crossrail is not varied as the headstock traverses along the crossrail.

*General organization of the machine*

Referring more particularly to the drawings the machine constituting the exemplary embodiment of the invention is of a complex nature and since the invention is primarily concerned with a rail leveling mechanism for the planer type milling machines selected for illustration, only such part of the machine as is pertinent to the operation of the rail leveling mechanism has been disclosed.

Shown in FIG. 1 is a planer milling machine 15 to which the rail leveling mechanism of the present invention has been applied. The machine 15 involves in its general organization a main base or bed 16 on which a work supporting table 18 is mounted for rectilinear movement by means of ways 19. A pair of columns or housings 20, 21 extend upwardly from opposite sides of the bed 16 immediately thereof, and each column is provided with guideways 22, 24, respectively by means of which the opposite ends of a vertically movable crossrail 25 are guided in their vertical up and down movements. For carrying the crossrail in its movement relative to the columns, a pair of elevating screws 26, 27 are provided and are threadably received in respective nuts 28, 29 carried adjacent the crossrail opposite ends. The elevating screws are rotated by a power unit, in the present instance an electric motor 30, coupled to the elevating screws through respective shafts 31, 32 and gear assemblies 33, 34. The crossrail 25 is provided with horizontal guideways 35 for slidably supporting a tool headstock assembly 36 for movement along the crossrail in a horizontal path. Shown in phantom in FIG. 1 is an additional headstock 37 illustrating that the crossrail 25 can be subjected to the weight and torque forces of two headstocks. Other crossrail constructions different from the presently illustrated one can be used, it being necessary to provide a suitable construction which permits accurately controlled relative movement between the rail and upright columns. A third headstock 23 movable vertically adjacent column 21 in response to rotation of a screw 23a is here shown.

The rail leveling mechanism includes a pair of coupling assemblies 38, 39 at the respective crossrail ends (see FIG. 2), for coupling the crossrail to upright columns 20, 21. Only the coupling mechanism on the one side, mechanism 39, is explained in detail. The mechanism 38 on the other side of the machine is of corresponding construction and cooperates to fix the other end of the rail to the housing. The two mechanisms are operated simultaneously.

Turning to FIG. 3 and the detailed showing of the coupling mechanism 39, a rack 42 is fastened to the upright column by suitable means, in the present instance machine screws 43. The rack 42 has a plurality of teeth 44 machined therein. There is also a rack on the column 20 (not shown). The two racks are machined as a pair so that the teeth on each correspond. Accordingly, when the two racks are mounted on the columns 20, 21 correponding teeth on each are the same distance from the machine bed 16.

For fixing the rail to the rack 42, a rack segment 45 having a plurality of complementary or interfitting teeth 46 is carried on the rail 25. There are two of these segments, one carried in each of the coupling assemblies 38, 39. Though in the present instance the rack 42 and the segment 45 are shown as provided with interfitting teeth, coupling could be achieved in other ways, for example by providing a tongue and groove interfit, a dowel and receiving opening interfit and the like. Furthermore, though the bearing surfaces are shown as substantially horizontal, in its broader aspects the invention includes providing inclined bearing surfaces on the respective teeth for easy meshing. Means are provide for engaging and disengaging the segment and rack, in the present instance a pair of pneumatic or hydraulic cylinders 48, 49 responsive to application of pressure. To indicate when the rack teeth 44 and the segment teeth 46 are alined for engagement, a sensor 50 (FIGS. 3 and 5) is carried on the crossrail and operates a light 51 (FIG. 6) to indicate to the operator that a push button PB2 (FIG. 6) may be operated to effect fixing of the rail.

The illustrative machine includes friction lamps 52a, 52b and 53a, 53b (see FIG. 2) for clamping the rail to gibs on the upright columns. The clamps are not described in detail as they are not a part of the present invention; suffice it to say that crossrail 25 can be clamped to the upright columns in the positions where the segments and racks cannot be engaged, i.e. where the teeth of the segments and racks would clash, by actuating push button PB1 in FIG. 6. As is explained subsequently, the clamps are ordinarily controlled to automatically engage the gibs after a preset time delay following stopping of vertical movement of the crossrail. Accordingly, in the present machine even if the clamping push button PB1 is not actuated the clamps will engage.

For coordinating the operation of the crossrail fixing and unfixing structure with the crossrail positioning mechanism, a control circuit 55 is provided. The circuit is shown schematically in FIG. 6 and is a part of a larger control circuit used to operate an actual machine tool. Accordingly, there is an inclusion of some relays and contacts which operate as a part of the overall control circuit, but do not normally function to fix the rail; these relays serving merely to complete the energizing electrical circuits for operation of the controlling relays and contacts for fixing the rail. Only the structure for effecting rail leveling is herein explained.

As has been noted, the green light 51 will operate to visually indicate to an operator that the segment 45 and the rack 42 are alined for engagement. Operation of the rail leveling mechanism is initiated by manual operation of a push button PB2. The coupling mechanisms and elevating screws at each end of the crossrail 25 operate in response to actuation of the push button. Since the structures at each side of the machine correspond to each other, only exemplary portions are explained. As viewed in FIG. 1, the coupling assembly 38 on the machine left-hand side and the elevating screw driving gear assembly 34 on the machine right-hand side are explained in detail.

Following actuation of the push button PB2, the elevating screws are first rotated in a direction to lower the crossrail 25. At the same time the hydraulic or pneumatic pressure fluid system is energized to move the respective segments in the coupling assemblies 38, 39 into engagement with the respective racks carried on the upright columns 20, 21. The elevating screws are turned by the motor 30 so as to lower the crossrail thereby transferring the weight of the crossrail from the elevating screw to the upright columns via the segment and rack coupling. Once the weight has been transferred to the upright columns, the crossrail 25 cannot move any lower and as a result the continued rotation of the elevating screws effects an axial movement of the latter in an upward direction. This action is sensed in the driving gear assembly 34 by a limit switch 56 having a follower 57 riding atop the end of elevating shaft 27. The limit switch acts to stop the motor 30.

As will be explained in connection with the description of the circuit 55, if rail fix push button PB2 is actuated and green light 51 is not on, the rail 25 is automatically lowered to a position where the light is on and the segments and racks are engaged. To transfer the weight of the crossrail back to the elevating screw so that the crossrail may be raised or lower as desired, a rail unclamp button PB3 is operated. First the friction clamps are disengaged, then the elevating screws are rotated. As the screws turn in the crossrail nuts 28, 29 the weight of the crossrail is again assumed by the elevating screws. At the same time, the pressure system is energized to disengage the segments from the racks and allow the crossrail to be moved freely up or down to the newly selected position.

*Rail elevating and fixing mechanism*

The sensor 50 (FIGS. 3 and 6) is carried on the crossrail 25 in proximity to rack teeth 44 to sense when the segment teeth 46 and the rack teeth 44 can be brought into engagement, i.e. when the respective teeth are so matched that they will not clash. To indicate that the segments and racks can be engaged, the sensor 50 energizes the green light 51. This tells an operator that he can now actuate push button PB2 and fix the rail 25 on the columns 20, 21.

To this end, the respective pneumatic or hydraulic actuator assemblies 38, 39 are energized. Turning to the assembly 38, the pneumatic or hydraulic cylinders 48, 49 respectively are coupled with the segment 45 by rods 60, 61 respectively. Each of the rods are connected to respective pistons 62, 63 within the cylinders 48, 49. The segment 45 is supported within a housing 64 carried on the crossrail 25. The housing is provided with a pair of apertures 65, 66 respectively to carry the rods 60, 61. The cylinders 48, 49 are mounted on the outside of the housing.

For effecting movement of the rods 60, 61 and thereby the segment 45, the pistons 62, 63 are actuated by operating an air or hydraulic fluid control valve 68 (see FIG. 6). The valve 68 is connected between a source of pressure (not shown) and the respective ends of cylinders 48, 49 by hoses or conduits 69, 70. Movement of the pistons 62, 63 in a direction to engage segment 45 with the rack 42 is effected by operating the valve 68 so that pressure is introduced into one side of the cylinders through hose or conduit 69 and pressure is exhausted from the other side of the cylinders through conduit 70. To disengage the segment 45 from rack 42, the valve 68 introduces pressure through hose or conduit 70 into the right-hand side of the cylinders 48, 49 as viewed in FIG. 3, and exhausts pressure through hose or conduit 69 from the left-hand side thereby moving the rods to the left and the segment out of engagement with the rack.

To sense the position of the segment 45, a limit switch 71 is mounted on the crossrail to engage a rod 72 extending from cylinder 48. The latter actuates the switch 71 when the piston 48 is at its extreme left-hand position indicating that the segment 45 is completely withdrawn from engagement with the rack 42. A limit switch is provided in each coupling assembly, switch 71 in coupling mechanism 38 and a limit switch 73 in the coupling mechanism 39.

For slidably supporting the segment 45 within the housing 64, respective upper and lower plates 75, 76 are interposed between the housing and the segment. These plates are ordinarily constructed of hardened material to withstand the stresses transmitted therethrough when the segment and rack coupling carries the weight of the crossrail. For adjusting clearance between the segment and the housing, a pair of screws 80, 81 are threaded in the housing and engage the lower plate 76. These screws can be loosened or tightened to adjust sliding fit between the segment and the plates.

One gear assembly 34 for rotating the elevating screw 27 is shown in FIG. 4. The other gear assembly 33 is of corresponding construction operating to rotate elevating screw 26, accordingly it is sufficient to explain only the operation of gear assembly 34. As is fully explained subsequently, one limit switch is necessary for sensing movement of one of the elevating screws in response to transfer of support of the rail between the elevating screws and the upright columns. For that purpose the switch 56 is provided in the gear assembly 34.

For transmitting drive from the shaft 32 to the elevating screw 27 the assembly 34 includes a driving gear 84 suitably fastened to the shaft 32, for example by a woodruff key (not shown) and meshed with a driven gear 85 fastened to the elevating screw end 88 by suitable means, here shown as a key 89. The gears are beveled so as to transmit drive through a 90 degree angle, the complete assembly being enclosed within a housing 86. The drive shaft and elevating screw are rotatably journaled in the housing 86. A radial bearing 87 mounted in housing 86 carries the drive shaft 32.

The gear assembly 34 in the present instance not only transmits drive to the elevating screw 27 to raise and lower one end of the crossrail, but also must allow limited axial movement of the elevating shaft to indicate rail support transfer and, in addition, carry the elevating screw with all the weight of one end of the crossrail. Explaining the structure, the driven gear 85 includes an integral depending collar portion 90 which slides over the elevating screw shaft end 88 and has a recess for receiving the key 89. The shaft end 88 and the collar 90 are keyed together so that a limited amount of axial sliding movement is permitted therebetween without hindering the transmittal of rotary drive to the elevating screw by the gear. Sliding movement occurs first when the elevating screw 27 and its end 88 move upwardly after the segment and rack are coupled and the elevating screw is rotated in a direction ordinarily lowering the crossrail. The dotted lines in FIG. 4 show the "up" position the elevating screw assumes. Sliding movement occurs in the opposite direction, i.e. downward, when the elevating screw 27 is rotated in the opposite direction ordinarily raising the crossrail 25. The gear collar 90 is rotatably held in fixed position relative to the housing 86 by a suitable radial bearing, in the present instance a ball bearing 91. The latter is retained in proper axial position by a nut 92 threaded on the collar end. The nut 92 acts axially to press the bearing 91 against annular retaining surfaces 93a, 93b respectively on the housing and collar. The gear 85 rotates relative to the housing 86 to turn the elevating screw, yet does not move axially when the elevating screw 27 moves upwardly.

For carrying an axial load which is applied to the driven gear 85 by the elevating screw 27, a thrust bearing is provided, in the present instance a ball bearing 95 with a pair of opposite races 95a, 95b. The bearing race 95a rests on a bearing surface 96 in the housing 86, while a spacer washer 97 is interposed between the bearing race 95b and a lower surface 85a of the gear 85.

The load carried by the elevating screw is applied to the gear 85 and therethrough to thrust bearing 95. For transmitting the load from the top of shaft end 88 to gear 85, a sleeve 100 is suitably fastened to the gear 85, in the present instance by a plurality of machine screws 101, one of which is shown, and journaled on the elevating shaft end 88 and retained in place by suitable fastening means, in the present instance an adjustable split nut 102 threaded on the shaft end 88 and locked in tightened position by a set screw 103. The sleeve 100 is rotatably held in position within the housing 86 by a radial bearing 104. The latter is anchored in position by an annular ring 105 suitably fastened to the housing 86, in the present instance by a plurality of machine screws 106, one of which is shown. In effect, the elevating screw is suspended on the thrust bearing 95 by virtue of the nut 102 acting through sleeve 100 and gear 85. The elevating screw is guided at its lower end by a bearing 110 receiving a lower shaft end 111 of the elevating screw (see FIG. 5). In the present instance, the bearing 110 is mounted on the upright column 21 and assures that the elevating screw maintains its proper position while rotating.

For effecting movement of the crossrail in response to rotation of the elevating screws 26, 27 the nuts 28, 29 are anchored substantially adjacent the opposite ends of the crossrail 25. Thus, as the screws 26, 27 rotate and the nuts 28, 29 remain stationary, the crossrail is elevated or lowered to the desired position. FIG. 7 shows screw 27 and nut 29 coupled.

Summarizing the operation of the crossrail leveling or fixing mechanism, upon alinement of the segments and racks, the hydraulic or pneumatic actuator assemblies 38, 39 are caused to engage the segments with the racks. At the same time the elevating screws are operated so as to lower the crossrail and place a load on the coupling between the segments and the racks, thereby effecting transfer of weight or support from the elevating screws to the upright columns. After the crossrail has lowered and support of the crossrail is transferred, continued rotation of the elevating screw 27 will cause it to react by moving axially in the vertical direction relative to the gear collar 99 and the sleeve 100. The raised vertical position of the elevating screw is shown in dotted lines in FIG. 4. The elevating screw end 88 actuates the follower 57 of limit switch 56. Actuation of the follower 57 deenergizes the elevating screw power unit 30. Accordingly, since both elevating screws are operated by the power unit 30, upon completion of the weight transfer rotation of both elevating screws is stopped.

To return the load to the elevating screws 26, 27 to reposition the crossrail, the power unit or electric motor 30 is operated to effect raising of the crossrail. Because the friction clamps automatically engage when movement of the crossrail stops, they must first be disengaged. Secondly, the elevating screw moves axially downward and the cam follower 57 also moves downward thereby deactuating the switch 56. Next, the crossrail is raised to allow the segments and the racks to be disengaged. The coupling mechanisms 38, 39 are then operated to withdraw the segments from engagement with the racks. The sequence is subsequently explained in detail.

Control circuit

Turning to FIG. 6, there is shown a control circuit for coordinating operation of the crossrail carrying means, in the present instance elevating screws 26, 27, with the crossrail fixing means, including in the present instance the segments and the racks to transfer support of the crossrail 25 between the elevating screws and the upright columns. Control circuit 55 is a simplified schematic diagram of the relevant portion of the control system of the machine tool 15. The circuit is energized from a source represented by lines 115, 116. The relays are shown in their normal or deenergized positions. The segments are retracted and the rail clamped in position by the friction clamps 52a, 52b and 53a, 53b. A distinction is made in the present description between "clamping" the crossrail using friction clamps and "fixing" the crossrail by engaging the segments and racks. To operate the friction clamps after a predetermined time delay, the control circuit 55 includes a time delay relay TDR13. The latter is adjusted to operate the rail clamp a predetermined time after the vertical movement of the crossrail is stopped.

The friction clamps are operated by a motor 118. The motor is energized when contacts R1a, R1b and R1c are actuated by relay R1 to engage the clamps. On the other hand, the motor effects unclamping when the contacts R8a, R8b, R8c are actuated by relay R8. For deenergizing the clamping relay R1 after clamping is effected, a limit switch LS3 is actuated by the clamps reaching an engaged position. Contrariwise, to deenergize the unclamping relay after unclamping is effected, a limit switch LS4 is actuated by the friction clamps disengaging and assuming a disengaged position. The friction clamps can be engaged manually by actuation of PB1. Since in the present instance the crossrail is always clamped either manually or after a time delay following termination of rail vertical traverse, in order to reposition the rail it is always necessary to "unclamp" the rail by operating push button PB3.

To fix the crossrail to the upright columns the "rail fix" push button PB2 is actuated. This completes an energizing circuit for relay R2 (115, PB2a, R3d, R10e, R7a, R2, 116). Energization of relay R2 actuates a series of contacts identified by "R2" and a lower case letter, R2a, R2b, R2c, R2d, R2e, R2f, R2g, R2h and R2i. The same convention is used throughout in identifying the relays and their associated contacts. First, contacts R2a are closed to seal around push button contacts PB2a and seal in relay R2. Contacts R2b are closed and contacts R2c are opened. The closing of contacts R2b prepares an energizing circuit for relay R5 and the opening of contacts R2c assures that relay R11 is not energized. As is explained subsequently, relays R5 and R11 control operation of the pressure system for engaging and disengaging the segments and racks. Contacts R2d are closed to complete an energizing circuit for relay R3 (115, R2d, R9c, R3, 116).

The energization of relay R3 actuates contacts R3a, R3b, R3c, R3d and R3e. The closing of contacts R3a, R3b couples an electronic motor speed control 119 across elevating screw motor 30. This effects motor rotation in a direction turning the elevating screws 26, 27 so as to lower the crossrail 25. The electronic motor speed control 119 provides selective operation of the motor 30 either at a fast speed or a slow speed. To shift the speed control 119 into low range, a relay R14 having contacts R14a, R14b is energized by closing of contacts R2i (115, R2i, R14, 116). It is recalled that contacts R2i were closed by actuation of "rail fix" push button PB2. Accordingly, the elevating screws 26, 27 are turned at a rate which lowers the crossrail slowly and permits smooth transfer of weight from the elevating screws to the upright columns. As is clear from the foregoing, this slow travel is achieved automatically in the control circuit 55 in response to operation of the "rail fix" push button PB2.

As has been explained previously, the control circuit 55 engages the segments with the racks only if they are properly positioned. Sensor 50 (FIGS. 3 and 6) having contacts 50a operates the light 51 to indicate that the segments and racks are in correct relative position for engagement. As is clear from the schematic of FIG. 6, when contacts 50a are closed, besides the indicator light 51 being energized, the relay R4 is also energized (115, 50a, R12c, R4, 116). Relay R4 controls the operation of the valve 68 by controlling energization of relays R5 and R11. The energization of relay R5 effects operation of the pressure system to engage the segments with the racks while energization of relay R11 effects operation of the system to disengage the segments and the racks. Thus, with the contacts R2b and R3c already being closed following energization of relays R2 and R3, the closing of contacts R4b energizes relay R5 opening the normally closed contacts R5a to deenergize a solenoid S6. The solenoid S6 controls the position of the valve 68. Upon deenergization of solenoid S6 the valve 68 is moved to a position directing pressure through the hose or conduit 69 to move the pistons 62, 63 to the right and engage the segment 45 with the rack 42. This same operation occurs in the other coupling assembly 39 to fix the rail 25 at the opposite end.

Relays R5 and R11 are coupled together to operate as latching relays. To this end a pawl 120 rides on a plunger 121 of relay R5. When the relay R5 is energized the pawl 120 falls into position to maintain the plunger 121 in its actuated position with the contacts R5a open. Not until the relay R11 is energized and the pawl 120 raised by a linkage mechanism 122 does the plunger 121 release and allow the contacts R5a to return to their normally closed position. The relay R11 is not energized until the "rail unclamp" button PB3 is operated.

As is clear from the foregoing, as the rail is lowered by operation of the motor 30 the segments are brought into engagement with the racks. An interlock system is provided so that if the "rail fix" push button PB2 is operated while the light 51 is not "on," i.e. an indication that the segments and racks cannot be engaged, the air or hydraulic system is not permitted to actuate the segments. To this end, relay R4 which controls energization of relay R5 is not energized unless the sensor contacts 50a are closed. Thus, if the segments and racks are in such position that the sensor contacts 50a are open, the contacts R4b are also opened and even though R3c and R2b are closed (because of actuation of the push button PB2) relay R5 cannot be energized. In that instance the motor 30 will lower the rail 25 until the sensor contacts 50a close whereupon the relay R4 will be energized and contacts R4b closed so that relay R5 can initiate operation of the pressure system to engage the segments and racks.

At the same time that the pressure system brings the segments and racks into engagement the relay R12 is deenergized. This is because the limit switches 71, 73 sense the respective positions of the segments in each of the coupling assemblies and are deactuated when the segments move from their retracted position to engagement with the racks. Accordingly, the respective contacts LS5, LS6 of the switches 71, 73 are opened. Thus, the contacts R12a, R12b, R12c, R12d and R12e are moved from their actuated position to a deactuated position. The circuit 55 is prepared for the sequence of operations to complete fixing of the rail and also to receive a signal to unclamp the rail.

To terminate lowering of the crossrail after the weight has been transferred from the elevating screws to the upright columns, the limit switch 56 having contacts LS2 is actuated in response to axial movement of elevating screw 27. The reactive upward movement of the elevating screw 27 actuates the limit switch 56 to close the contacts LS2 and energize relay R7 (115, LS2, R7, 116).

The energization of relay R7 opens contacts R7a which deenergizes relay R2. Deenergization of relay R2 opens contacts R2d and thereby deenergizes relay R3 so that contacts R3a, R3b connecting the motor 30 to the speed control 119 are opened and the motor is thereby deenergized. Accordingly, rotation of the elevating screws is stopped. The weight of the crossrail carried by the elevating screws is now completely transferred to the segments and racks. By moving a limited amount in the upward direction, the elevating screw has completely unloaded itself.

To reposition the crossrail 25, i.e. either lower it or raise it, it is necessary to transfer the weight of the crossrail from the upright columns to the elevating screws. This is effected automatically in the present instance by actuating "rail unclamp" push button PB3. Actuation of the latter closes contacts PB3b and completes an energizing circuit for relay R8 (115, PB1b, PB3b, LS4, R8, 116). As has been explained, energization of relay R8 closes contacts R8a, R8b, R8c to provide electrical power for motor 118 of a polarity effecting motor rotation in a direction to disengage the friction clamps 52a, 52b and 53a, 53b. In addition, contacts R8d are closed to provide a bypass circuit around contacts PB3b so that relay R8 will continue to be energized after push button PB3 is released. At the same time closing of contacts R8d completes an energizing circuit for relay R9 (115, PB1b, R8d, R2f, R12d, R9, 116). It is noted that contacts R12d are closed because relay R12 has been deenergized following opening of limit switches LS5 and LS6 as a result of the segments moving forward to their engaged positions. Relay R9 controls energization of the elevating screw motor 30 for rotation of the elevating screws in a direction raising the crossrail 25.

The closing of contacts R9a seals in relay R9. Accordingly, the relay R9 is maintained energized though the relay R8 is deenergized when limit switch LS4 opens in response to the friction clamps reaching their rest positions. The closing of contacts R9b energizes a "rail up" relay R10 (115, R7c, R9b, R12a, R10, 116). Explaining the energizing circuit for relay R10, contacts R7c are still in their closed or actuated position as a result of relay R7 being energized in response to elevating screw 27 moving axially upward following transfer of the crossrail load to the upright columns. The contacts R12a are closed because the segments are engaged and relay R12 is deenergized.

Energization of relay R10 closes contacts R10a, R10b to connect the electronic motor speed control 119 across motor 30. At the same time contacts R10c are closed and a circuit is completed through low speed control relay R14 (115, R10c, R9d, R12e, R14, 116). Contacts R14a are closed to put the speed control 119 into low speed operation. Contacts R14b are closed to maintain the low speed relay R14 energized even though the contacts R10c return to their rest position. The contacts R10a, R10b couple the electronic motor speed control 119 across the motor 30 to energize the latter so that it slowly rotates the elevating screws in a direction raising the crossrail 25.

The first effect of the rotation of the elevating screws is that the latter move axially downward and contacts LS2 of limit switch 56 are opened and relay R7 is deenergized. The contacts R7b will return to their normally closed position and an energizing circuit is completed for "segment retract" relay R11 (115, R7b, R10d, R2c, R4a, R11, 116). Energization of relay R11 actuates the linkage 122 and releases pawl 120 so that the spring loaded plunger 121 can return to its rest position wherein the contacts R5a are closed. The closing of contacts R5a completes an energizing circuit for solenoid S6 which moves control valve 68 to a position directing fluid pressure into conduit 70 on the left-hand side of cylinders 48, 49 forcing the pistons 62, 63 to the left. The segment 45 is thereby retracted. The segment in the other coupling mechanism 39 is also retracted. Thus, as the motor 30 continues to rotate the elevating screws in a direction raising the crossrail at the slow speed, the segments are simultaneously retracted.

When the segments are fully retracted the limit switches LS5 and LS6 are closed and relay R12 is energized. The contacts R12a are then opened and relay R10 is deenergized. The deenergization of the latter opens contacts R10a, R10b and stops rotation of motor 30 by disconnecting the power source 119. The remaining energization relays in the circuit are deenergized and the circuit 55 is returned to a rest state in which the time delay relay TDR13 is energized and ready to operate friction clamps when movement of the crossrail is stopped.

As is clear from the foregoing, the crossrail leveling system provides rigid support of the crossrail by coupling it to the upright columns, yet versatility is maintained in positioning of the crossrail by providing for automatic transfer of support of the crossrail between the upright columns 20, 21 and elevating screws 26, 27. The system includes interlock structures so that the coupling and uncoupling automatically occurs in a sequence of steps so that there is not jamming or clashing of the coupling mechanism. The system is sufficiently simple so that it can be used with conventional machine tool units while providing the required rigid support of the crossrail, even under extreme load conditions, to maintain accurate positioning of the work tool. Though a pneumatic or hydraulic system is specifically described for engaging the segments and racks, other systems for example, electrical and mechanical can be also used. Furthermore, though a pair of upright columns are shown, it is possible to practice the present invention in an installation using one upright column.

I claim as my invention:

1. In a crossrail leveling mechanism for use with a machine tool having a pair of upright column and a crossrail vertically movable relative to the column, the combination comprising a crossrail carying means for effecting vertical movement of the crossrail relative to said columns, a pair of vertically disposed racks each having a plurality of teeth and mounted on respective ones of said columns, a pair of segments each having a plurality of teeth, one segment being carried at each of the respective crossrail ends for engagement with a complementary one of said racks, a first sensor means for indicating when said rack teeth and said segment teeth are alined for engagement, means for engaging said segment teeth and said rack teeth to fix the crossrail and upright columns together, said crossrail carrying means being adapted upon engagement of said rack and segment teeth to transfer the weight of the crossrail to said upright columns by lowering said crossrail, and a second sensor means coupled with said crossrail carrying means and actuated after completion of the weight transfer to stop lowering of said crossrail.

2. In a crossrail leveling mechanism for use with a machine tool having at least one upright column and a crossrail vertically movable relative to the column, the combination comprising an elevating screw carrying the crossrail for vertical movement relative to the column, means for rotating said elevating screw to selectively position said crossrail, a vertically disposed rack anchored to the column, a segment carried on the crossrail adjacent said rack and engageable therewith, a first sensor for indicating when said rack and said segment are alined for engagement, pressure means for engaging said segment with said rack to selectively tie the crossrail and upright column together, a control circuit coupled to said pressure means and said elevating screw rotating means to lower the crossrail and to operate said pressure means to engage said segment with said rack thereby coordinating the transfer of the weight of the crossrail from said elevating screw to said upright column, and a second sensor coupled to said elevating screw and said control circuit and responsive to upward movement of said screw as said crossrail is held stationary by said segment and rack coupling while the elevating screw rotates to stop operation of said elevating screw.

3. The combination with a machine having a set of upright columns and a vertically movable crossrail with a tool holder slidably disposed on said crossrail and adapted to traverse the latter, of a crossrail carrying means for effecting vertical movement of the crossrail relative to the upright columns, vertically disposed racks mounted on the columns, each column having one rack anchored thereto, a pair of segments one carried at each of the respective crossrail ends for engagement with a complementary one of said racks, actuating means for engaging and disengaging said segments with said racks to respectively fix and unfix the crossrail on the upright columns, a controller coupled to said crossrail carrying means and said segment actuating means to effect transfer of crossrail support between said carrying means and the upright columns, and a sensor coupled to said controller for indicating when said rack and said segment are alined for engagement.

4. In a crossrail leveling mechanism for use with a machine tool having at least one upright column and a crossrail vertically movable relative to the column, the combination comprising a crossrail carrying means for effecting vertical movement of the crossrail relative to the column, a vertically disposed rack anchored to the column, a segment carried on the crossrail adjacent said rack and engageable therewith, a first sensor for indicating when said rack and said segment are alined for engagement, means for engaging said segment with said rack to tie the crossrail and upright column together, said crossrail carrying means being operative after the crossrail and upright column are tied together to transfer the weight of the crossrail from said carrying means to said upright column, and a second sensor coupled with said crossrail carrying means and actuated after completion of the weight transfer to stop operation of said carrying means.

5. The combination with a machine having a set of upright columns and a vertically movable crossrail with a tool holder slidably disposed on said crossrail and adapted to traverse the latter, of a crossrail carrying means for effecting vertical movement of the crossrail relative to the upright columns, vertically disposed racks mounted on the columns, each column having one rack anchored thereto, a pair of segments, one carried at each of the respective crossrail ends for engagement with a complementary one of said racks, a sensor for indicating when said racks and said segments are alined for engagement, means for engaging said segments and said racks to fix the crossrail and upright columns together, and a controller coupled to said crossrail carrying means for operating the latter to effect transfer of the crossrail weight from the carrying means to the upright columns.

6. In a crossrail leveling mechanism for use with a machine tool having at least one upright column and a crossrail carried by means for vertically moving the crossrail relative to the column, coupling means for fixing said crossrail to said column comprising, in combination, an anchored coupling member on the upright column, a movable coupling member on the crossrail selectively operable for interfitting engagement with said anchored coupling member, a first sensor for sensing when said coupling members are alined for interfitting engagement, means selectively operable to actuate said movable coupling member into engagement with said anchored coupling member, a control circuit responsive to operation of said first sensor and coupled to said actuating means and said crossrail carrying means to coordinate lowering of the crossrail with engagement of said coupling members thereby transferring the weight of said crossrail from said carrying means to said upright column, and a second sensor responsive to transfer of weight from said carrying means to said upright column to terminate operation of said carrying means in a direction lowering the crossrail.

7. In a crossrail leveling device for use with a machine tool having a pair of upright columns and a crossrail vertically movable relative to the columns comprising, in combination, elevating screws disposed adjacent said columns for vertically moving the crossrail, means for rotating said elevating screws, coupling means for selectively fixing the crossrail to the columns including engageable segments and racks, one of the latter being anchored in position and the other being movable into engagement with the anchored one, a first sensor responsive to alinement of said segments and racks for engagement, pressure means for actuating said movable one of said respective racks and segments to bring the latter into engagement, a control circuit responsive to operation of said first sensor and coupled to said pressure means and said elevating screws to lower said crossrail and operate said pressure means so as to coordinate transfer of weight from elevating screws to the upright columns, and a second sensor for disabling said rotating means responsive to movement of said elevating screws upon rotation of the latter after said rail and columns are fixed by engagement of said racks and segments.

8. In a crossrail leveling device for use with a machine tool having at least one upright column and a crossrail vertically movable relative to the column, the combination comprising crossrail carrying means for effecting vertical movement of the crossrail relative to the upright column, a vertically disposed rack anchored to said column, a segment carried on the crossrail adjacent said rack and engageable therewith, a first sensor disposed adjacent said rack and said segment for indicating when they are alined for engagement, means for actuating said segment into and out of engagement with said rack for selectively fixing and unfixing said crossrail to said column, a second sensor disposed adjacent said crossrail carrying means, and a control circuit responsive to said first and second sensors and coupled to said crossrail carrying means and said actuating means to coordinate the operation of the latter in selectively fixing and unfixing the crossrail and transfer of the weight of the latter between said crossrail carrying means and said upright columns.

9. In a leveling mechanism for use with a machine tool having a rigid upright support and a machine member vertically movable relative thereto, the combination comprising a carrying means for effecting vertical movement of said machine member relative to said upright support, a pair of laterally spaced vertically disposed racks mounted on said upright support, a pair of correspondingly laterally spaced segments mounted on said machine member for engagement respectively with complementary ones of said racks, a sensor for indicating when said racks and said segments are alined for engagement, means for engaging said segments and said racks to fix said machine member and upright support together, and a controller coupled to said carrying means for operating the latter to effect transfer of the machine member weight from the carrying means to said upright support.

References Cited by the Examiner
UNITED STATES PATENTS

| | | | |
|---|---|---|---|
| 1,791,757 | 2/1931 | Glasner et al. | 78—25 X |
| 2,134,743 | 11/1938 | Strawn | 90—16 |
| 2,901,947 | 9/1959 | Wainger et al. | 90—16 |

WILLIAM W. DYER, JR., *Primary Examiner.*

LEON PEAR, *Examiner.*